United States Patent
Song et al.

(10) Patent No.: US 10,182,002 B1
(45) Date of Patent: Jan. 15, 2019

(54) SIGNAL CHARACTERISTIC INFORMATION FOR NETWORKS

(71) Applicant: Juniper Networks, Inc., Sunnyvale, CA (US)

(72) Inventors: Dai Song, Milpitas, CA (US); Domenico Di Mola, Fremont, CA (US); Puneet Jain, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/693,066

(22) Filed: Aug. 31, 2017

Related U.S. Application Data (63) Continuation of application No. 14/942,017, filed on Nov. 16, 2015, now Pat. No. 9,755,956.

(51) Int. Cl.
*H04B 10/079* (2013.01)
*H04L 12/721* (2013.01)
*H04Q 11/00* (2006.01)

(52) U.S. Cl.
CPC ......... *H04L 45/26* (2013.01); *H04B 10/0793* (2013.01); *H04Q 11/0066* (2013.01); *H04Q 2011/009* (2013.01); *H04Q 2011/0073* (2013.01)

(58) Field of Classification Search
CPC ..... H04B 10/0793; H04B 10/27; H04Q 11/00
See application file for complete search history.

(56) References Cited

U.S. PATENT DOCUMENTS

| | | | |
|---|---|---|---|
| 9,755,956 B1 | 9/2017 | Song et al. | |
| 2008/0219184 A1* | 9/2008 | Fowler | H04L 43/0811 370/254 |
| 2008/0291922 A1* | 11/2008 | Sultan | H04L 12/4641 370/395.53 |
| 2010/0309816 A1 | 12/2010 | Diab | |
| 2011/0167269 A1* | 7/2011 | Baykal | H04L 63/061 713/169 |
| 2015/0207677 A1* | 7/2015 | Choudhury | H04L 41/0806 370/254 |
| 2015/0271169 A1* | 9/2015 | Seligson | H04L 63/0892 726/4 |

* cited by examiner

*Primary Examiner* — Dzung Tran
(74) *Attorney, Agent, or Firm* — Harrity & Harrity, LLP (57) ABSTRACT

A device may cause an optical signal to be transmitted via a network path. The device may receive, from a network device, a link layer discover protocol (LLDP) message. The LLDP message may include signal characteristic information regarding the optical signal. The device may adjust transmission of the optical signal based on receiving the LLDP message. The device may cause an adjusted optical signal to be transmitted via the network path based on adjusting transmission of the optical signal.

20 Claims, 7 Drawing Sheets

SIGNAL CHARACTERISTIC INFORMATION FOR NETWORKS

RELATED APPLICATION

This application is a continuation of U.S. patent application Ser. No. 14/942,017, filed Nov. 16, 2015 (now U.S. Pat. No. 9,755,956), which is incorporated herein by reference.

BACKGROUND

A communications protocol, such as a link layer discovery protocol (LLDP) may be utilized by a network device to provide information regarding an identity of the network device, a capability of the network device, or the like. For example, a first network device may transmit an LLDP message to a second network device identifying a chassis identifier associated with the first network device, one or more port identifiers associated with network ports of the first network device, or the like.

SUMMARY

According to some possible implementations, a device may include one or more processors. The one or more processors may cause an optical signal to be transmitted via a network path. The one or more processors may receive, from a network device, a link layer discover protocol (LLDP) message. The LLDP message may include signal characteristic information regarding the optical signal. The one or more processors may adjust transmission of the optical signal based on receiving the LLDP message. The one or more processors may cause an adjusted optical signal to be transmitted via the network path based on adjusting transmission of the optical signal.

According to some possible implementations, a non-transitory computer-readable medium may store one or more instructions that, when executed by one or more processors of a device, may cause the one or more processors to receive a first network topology message from a first network device associated with a network path. The first network topology message may include a mandatory set of fields including first network topology information regarding the first network device. The first network topology message may include an optional set of fields including signal characteristic information. The one or more instructions, when executed by one or more processors of a device, may cause the one or more processors to generate a second network topology message after receiving the first network topology message. The second network topology message may include a mandatory set of fields including second network topology information regarding the device. The second network topology message may include an optional set of fields including the signal characteristic information. The one or more instructions, when executed by one or more processors of a device, may cause the one or more processors to transmit the second network topology message to a second network device of the network path.

According to some possible implementations, a method may include receiving, by a device, a signal via a network path and from a network device. The method may include determining, by the device, a characteristic of the signal based on receiving the signal. The method may include including, by the device, information identifying the characteristic of the signal in a message. The message may be associated with conveying network topology information associated with the network path. The method may include transmitting, by the device, the message to the network device.

DETAILED DESCRIPTION

The following detailed description of example implementations refers to the accompanying drawings. The same reference numbers in different drawings may identify the same or similar elements.

A set of network devices (e.g. network nodes) may be utilized for communication via a network. For example, a first network device (e.g., a first endpoint network device) may receive information for communication to a second network device (e.g., a second endpoint network device) via transmission of an optical signal. The first network device may transmit the information to the second network device via one or more other network devices (e.g., one or more intermediate network devices).

The set of network devices may communicate network topology information via a particular communications protocol, such as link layer discovery protocol (LLDP) or the like. For example, the first network device may transmit an LLDP message to another network device that neighbors the first network device (e.g., without an intervening network device located between the first network device and the other network device in a network path). The LLDP message may include one or more type-length value (TLV) fields identifying the first network device (e.g., a chassis identifier), information identifying one or more network ports of the first network device (e.g., a port identifier), or the like. In this way, the set of network devices propagate information regarding a network topology.

An endpoint network device, of the set of network devices, may alter a characteristic of a signal to improve network performance for signals transmitted between the endpoint network device and another endpoint network device of the set of network devices. For example, the endpoint network device may alter a transmission power, a transmission frequency, a forward error correction (FEC) scheme, or the like. In this way, the endpoint network device may reduce a bit error rate (BER), increase a received optical power associated with a transmission, or the like. A network operator may determine a signal characteristic based on a measurement of a signal received at the other endpoint network device, and may reconfigure the endpoint device (e.g., that transmitted the signal) to improve the network performance.

However, manually adjusting pairs of endpoint network devices to improve network performance may become impractical as a quantity of pairs of endpoint network devices increases for a network. Moreover, as a network topology changes (e.g., intermediate network devices are disconnected from or added to the network, endpoint network devices are disconnected from or added to the network, network paths are altered, etc.), delays may be experienced in updating direct connections between each pair of endpoint network devices. Implementations, described herein, may utilize a configurable portion of a communications protocol to facilitate providing information regarding a signal characteristic without requiring that a pair of endpoint network devices be directly connected.

Figure 1A:
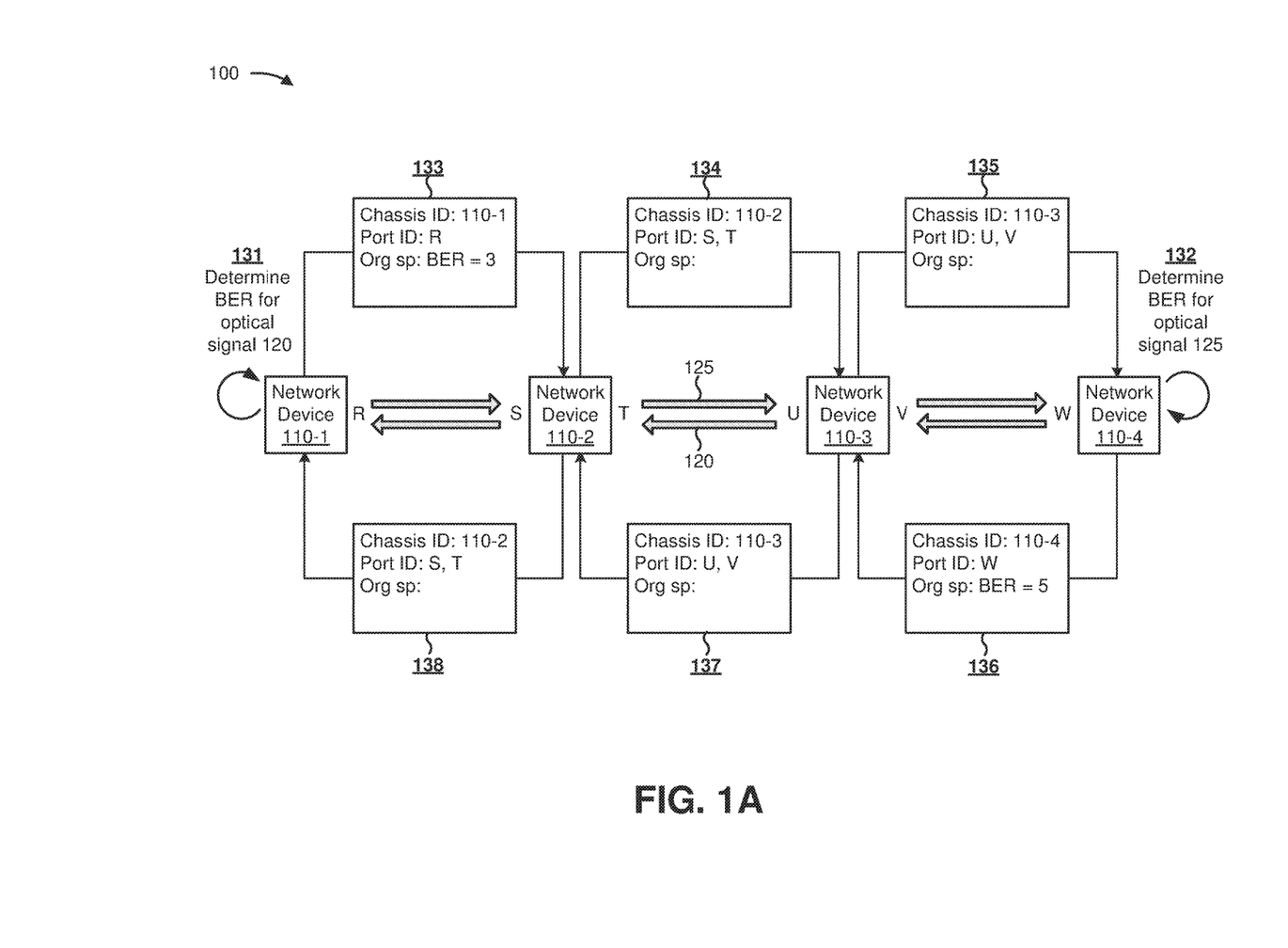
FIGS. 1A-1D are diagrams of an overview of an example implementation described herein.

FIGS. 1A-1D are diagrams of an overview of an example implementation 100 described herein. As shown in FIG. 1A, example implementation 100 includes a set of network devices 110-1 through 110-4. Assume that network device 110-1 is a first endpoint network device, network device 110-2 is a first intermediate network device, network device 110-3 is a second intermediate network device, and network device 110-4 is a second endpoint network device. Collectively, network devices 110-1 through 110-4 are associated with a network path of a network for transmitting optical signals. Network device 110-1 may be associated with a network port (e.g., "R"). Network device 110-2 may be associated with a first network port (e.g., "S") and a second network port (e.g., 'T'). Network device 110-3 may be associated with a first network port (e.g., "U") and a second network port (e.g., "V"). Network device 110-4 may be associated with a network port (e.g., "W").

As further shown in FIG. 1A, network device 110-1 receives an optical signal 120 from network device 110-4 via network device 110-2 and network device 110-3. Similarly, network device 110-4 receives an optical signal 125 from network device 110-1 via network device 110-3 and network device 110-2. Assume that network device 110-1 is not directly connected to network device 110-4 to communicate information regarding a signal characteristic.

As further shown in FIG. 1A, and by reference number 131, network device 110-1 determines a BER value associated with optical signal 120 at a first time interval. For example, assume that network device 110-1 determines the BER value for optical signal 120 to be 3 (e.g., $3\times10^{-15}$ bit errors per bit). Similarly, as shown by reference number 132, network device 110-4 determines a BER value associated with optical signal 125 at the first time interval. For example, assume that network device 110-4 determines the BER value for optical signal 125 to be 5 (e.g., $5\times10^{-15}$ bit errors per bit). Assume that, at the first time interval, network devices 110-1 through 110-4 generate a set of link layer discovery protocol (LLDP) messages 133 through 138 for transmission at the first time interval.

As further shown in FIG. 1A, network device 110-1 transmits LLDP message 133, which includes network topology information for network device 110-1. The network topology information is encapsulated by a set of type-length-values (TLVs), such as one or more TLV fields identifying network device 110-1 (e.g., "Chassis ID: 110-1") and one or more TLV fields identifying the network port of network device 110-2 (e.g., "Port ID: R"). LLDP message 133 includes an organizationally specific TLV (e.g., a configurable portion for transmitting other information). The organizationally specific TLV includes one or more TLV fields identifying the BER value associated with optical signal 120 at the first time interval (e.g., "Org sp: BER=3") for propagation rightward to network device 110-4.

As further shown in FIG. 1A, network device 110-2 transmits an LLDP message 134, which includes network topology information for network device 110-2. The network topology information includes a TLV (e.g., one or more TLV fields) identifying network device 110-2 and a TLV identifying the first port and the second port of network device 110-2. LLDP message 134 includes a null organizationally specific TLV (e.g., "Org sp:") based on having not yet received the BER value from network device 110-1 for propagation to network device 110-4 at a previous time interval. In another example, network device 110-2 may transmit a blank organizationally specific TLV, may omit the organizationally specific TLV, or the like. Network device 110-3 transmits LLDP message 135, which includes network topology information and a null organizationally specific TLV. Network device 110-4 transmits LLDP message 136, which includes network topology information and an organizationally specific TLV identifying the BER value associated with optical signal 125 at the first time interval (e.g., "Org sp: BER=5") for propagation leftward to network device 110-1. Network devices 110-3 and 110-2 transmit LLDP messages 137 and 138, respectively.

Figure 1B:
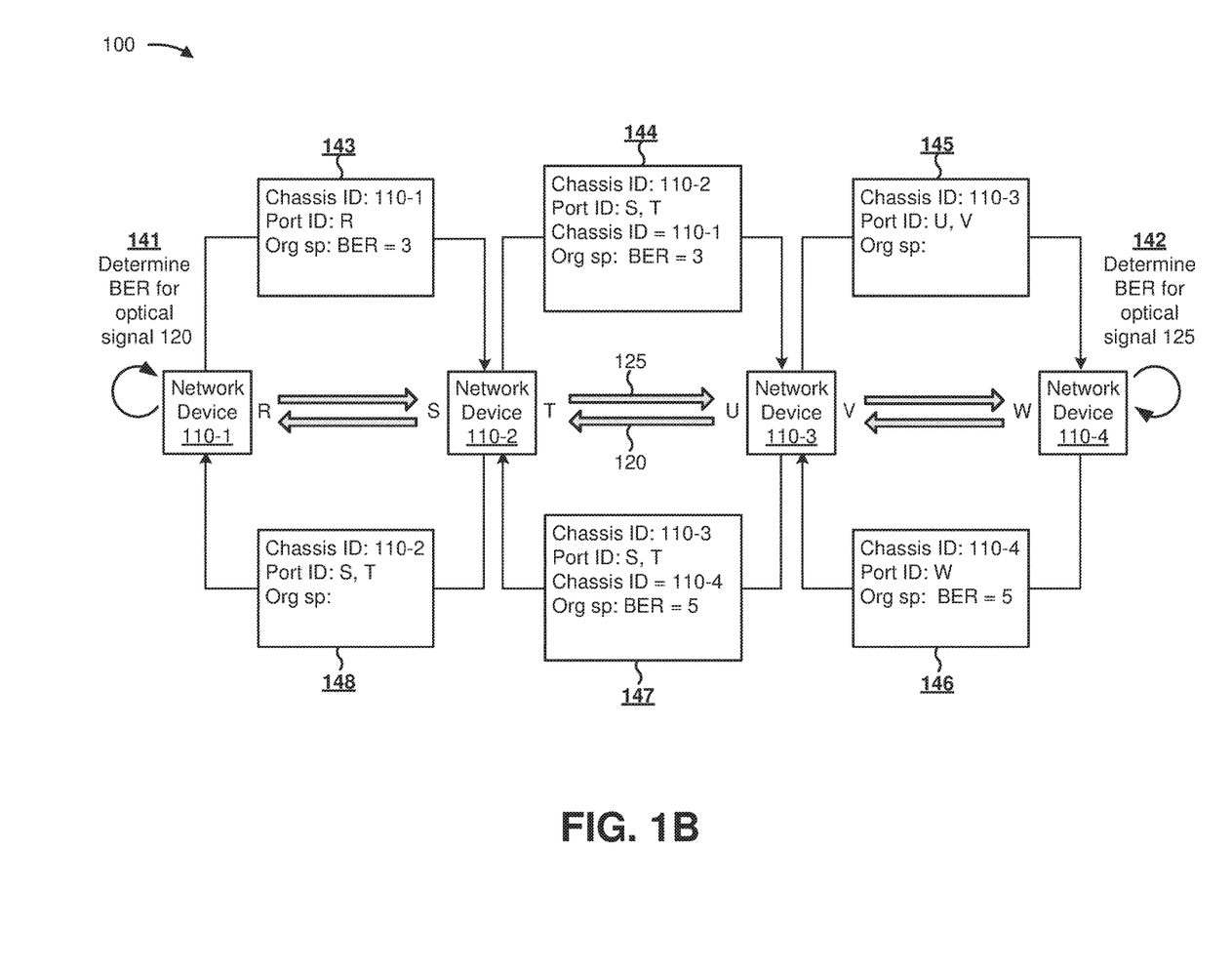

As shown in FIG. 1B, and by reference numbers 141 and 142, network devices 110-1 and 110-4 determine BER values for optical signals 120 and 125, respectively, at a second time interval. Assume that network devices 110-1 through 110-4 generate a set of LLDP messages 143 through 148 for transmission at the second time interval. For example, network device 110-1 transmits LLDP message 143, which includes network topology information regarding network device 110-1 and an organizationally specific TLV identifying the BER value associated with optical signal 120 at the second time interval for propagation rightward to network device 110-4.

As further shown in FIG. 1B, network device 110-2 transmits LLDP message 144, which includes network topology information regarding network device 110-2 and an organizationally specific TLV identifying the BER value associated with optical signal 120 at the first time interval (e.g., that was received via LLDP message 133). In this way, network device 110-2 propagates the BER value toward network device 110-4. Network device 110-3 transmits LLDP message 145, which includes network topology information regarding network device 110-3 and a null organizationally specific TLV (e.g., network device 110-3 did not receive a BER value for propagation in the rightward direction at the first time interval). Similarly, network devices 110-4, 110-3, and 110-2 transmit LLDP messages 146, 147, and 148, respectively.

Figure 1C:
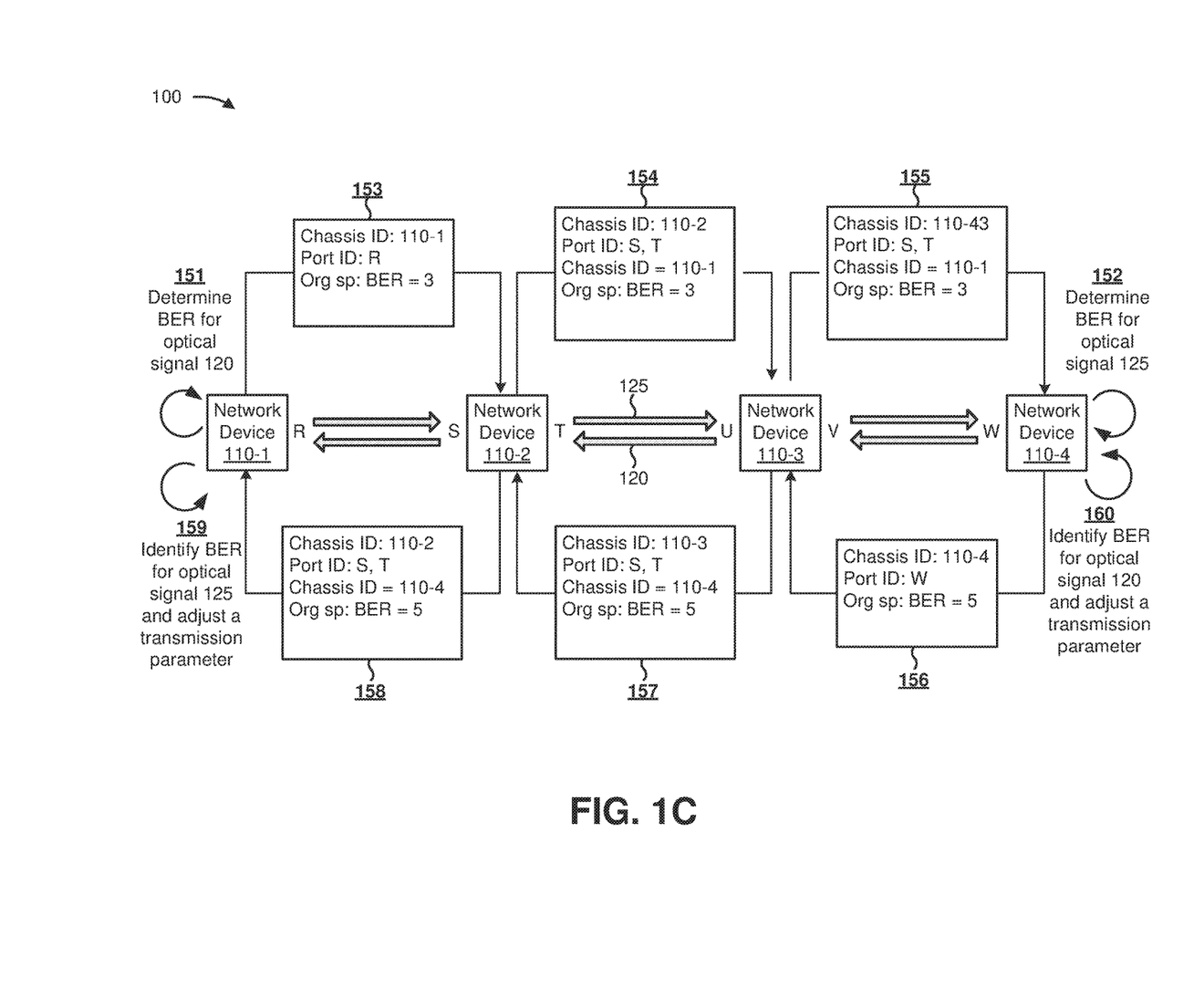

As shown in FIG. 1C, and by reference numbers 151 and 152, network devices 110-1 and 110-4 determine BER values for optical signals 120 and 125, respectively, at a third time interval. Assume that network devices 110-1 through 110-4 generate a set of LLDP messages 153 through 158 for transmission at the third time interval. For example, network device 110-1 transmits LLDP message 153, which includes network topology information regarding network device 110-1 and an organizationally specific TLV identifying the BER value associated with optical signal 120 at the third time interval for propagation rightward to network device 110-4.

As further shown in FIG. 1C, network device 110-2 transmits LLDP message 154, which includes network topology information regarding network device 110-2 and an organizationally specific TLV identifying the BER value associated with optical signal 120 at the second time interval (e.g., that was received via LLDP message 143). As another example, network device 110-3 transmits LLDP message 155, which includes network topology information regarding network device 110-3 and an organizationally specific TLV identifying the BER value associated with optical signal 120 at the first time interval (e.g., that was received via LLDP message 144). In this way, network devices 110-2 and 110-3 propagate BER values toward network device 110-4. Similarly, network devices 110-4, 110-3, and 110-2, transmit LLDP messages 156, 157, and 158, respectively, thereby propagating BER values toward network device 110-1.

As further shown in FIG. 1C, and by reference number 159, based on receiving LLDP message 158 at the third time interval, network device 110-1 identifies the BER value for optical signal 125 at the first time interval (e.g., $5 \times 10^{-15}$ errors per bit)), which is identified by a field of the organizationally specific TLV of LLDP message 158. Based on the BER value, network device 110-1 adjusts optical signal 125 to improve network performance of the network relative to maintaining optical signal 125 as previously transmitted. For example, network device 110-1 may increase a transmission power with which network device 110-1 transmits optical signal 125, thereby reducing the BER value and improving network performance. Similarly, as shown by reference number 160, network device 110-4 identifies the BER value for optical signal 120 at the first time interval (e.g., $3 \times 10^{-15}$ errors per bit), which is identified by a field of the organizationally specific TLV of LLDP message 155, and adjusts optical signal 120 to improve network performance. In this way, network devices 110-1 and 110-4 utilize information regarding a characteristic of respective optical signals, propagated via a configurable portion of a set of LLDP messages, to adjust the respective optical signals without being directly connected to exchange signal characteristic information.

Figure 1D:
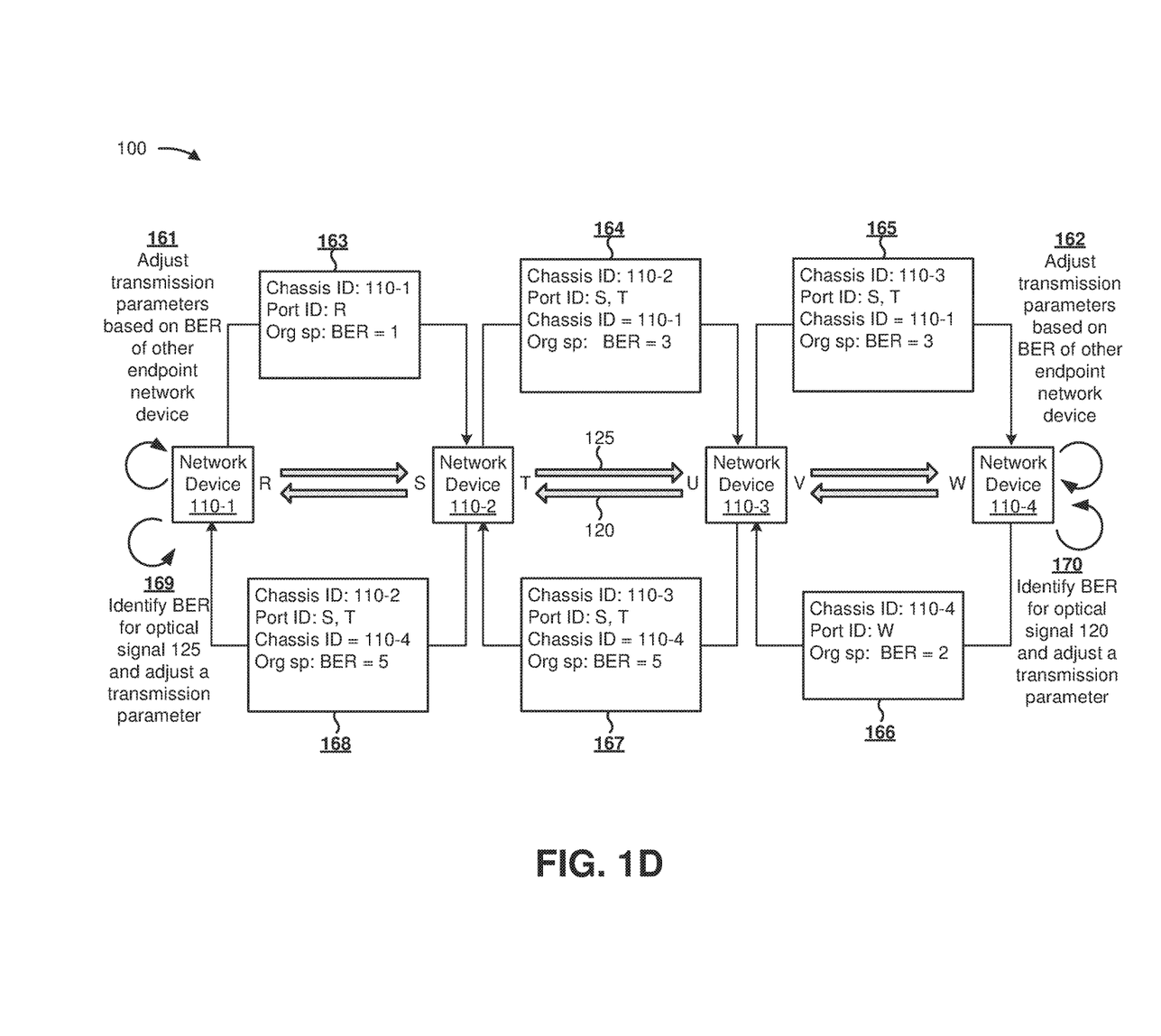

As shown in FIG. 1D, and by reference numbers 161 and 162, network devices 110-1 and 110-4 determine BER values for optical signal 120 and 125, respectively, at a fourth time interval. Assume that network devices 110-1 through 110-4 generate a set of LLDP messages 163 through 168 for transmission at the fourth time interval. As shown by LLDP messages 163 and 166, optical signals 120 and 125 are each associated with a reduced BER value based on adjusting the transmission parameters of the optical signals. As shown by reference numbers 169 and 170, network devices 110-1 and 110-4 continue to adjust transmission parameters of optical signals 125 and 120, respectively, based on receiving signal characteristic information via LLDP messages.

In this way, a set of network devices include signal characteristic information in an exchange of network topology information utilizing a configurable portion of an LLDP message, thereby propagating the signal characteristic information without requiring a direct connection between endpoint network devices or a separate set of communications. Moreover, a pair of endpoint network devices, of the set of network devices, utilize the signal characteristic information to adjust optical signals transmitted via the set of network devices to improve network performance for the set of network devices relative to statically transmitting the optical signals.

Figure 2:
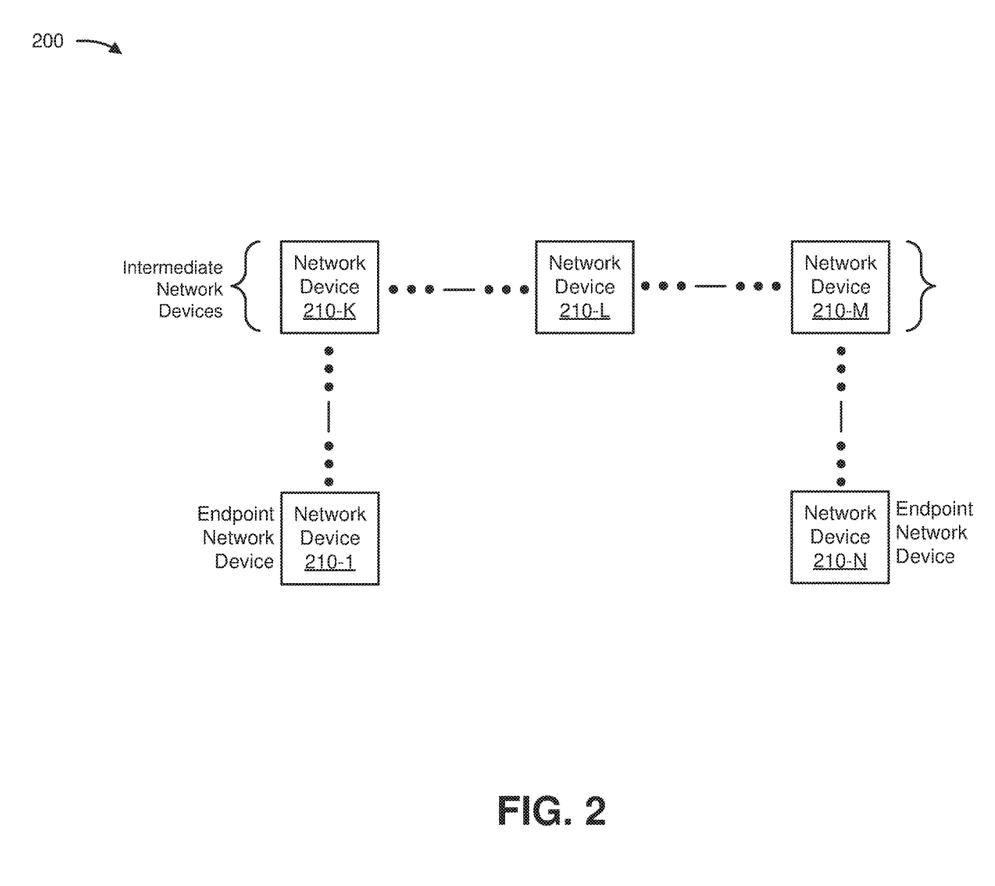
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210"). Network device 210 may be associated with one or more networks. Devices of environment 200 may interconnect via wired connections, wireless connections, or a combination of wired and wireless connections.

Network device 210 may include one or more devices capable of generating, storing, receiving, processing, and/or providing information associated with a network topology and a characteristic of a signal. For example, network device 210 may include a firewall, a router, a gateway, a switch, a hub, a bridge, a reverse proxy, a server (e.g., a proxy server), a transmitter, a receiver, a transceiver, a multiplexer, a demultiplexer, an optical add-drop multiplexer, or a similar device that routes network traffic. In some implementations, network device 210 may utilize one or more communications protocols for transmitting and/or receiving information. For example, network device 210 may utilize an LLDP based communication protocol or another communications protocol that permits inclusion of configurable information, such as signal characteristic information identifying a characteristic of a signal or the like.

When a first network device 210 is an endpoint of a network path including a set of network devices 210 (e.g., an initial network device 210 of the network path, a final network device 210 of the network path, etc.), the first network device 210 may be termed an endpoint network device 210. A set of other network devices 210 of the network path may be termed a set of intermediate network devices 210. A first network device 210 that is adjacent to a second network device 210 in a network path (without any intervening network devices 210) may be termed neighboring network devices 210.

In some implementations, a pair of endpoint network devices 210 of a network path may lack a direct connection for transmitting configuration information, such as information identifying a characteristic of a signal or the like. In this case, including signal characteristic information in an existing network topology message permits endpoint network devices 210 to propagate signal characteristic information without a direct connection. Alternatively, when the pair of endpoint network devices 210 are neighboring network devices 210, the pair of endpoint network devices 210 may include a direct connection. In this case, including signal characteristic information in an existing network topology message reduces a quantity of transmitted messages relative to providing signal characteristic information via a separate set of messages.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally. or alternatively, a set of devices (e.g., one or more devices) of environment 200 may perform one or more functions described as being performed by another set of devices of environment 200.

Figure 3:
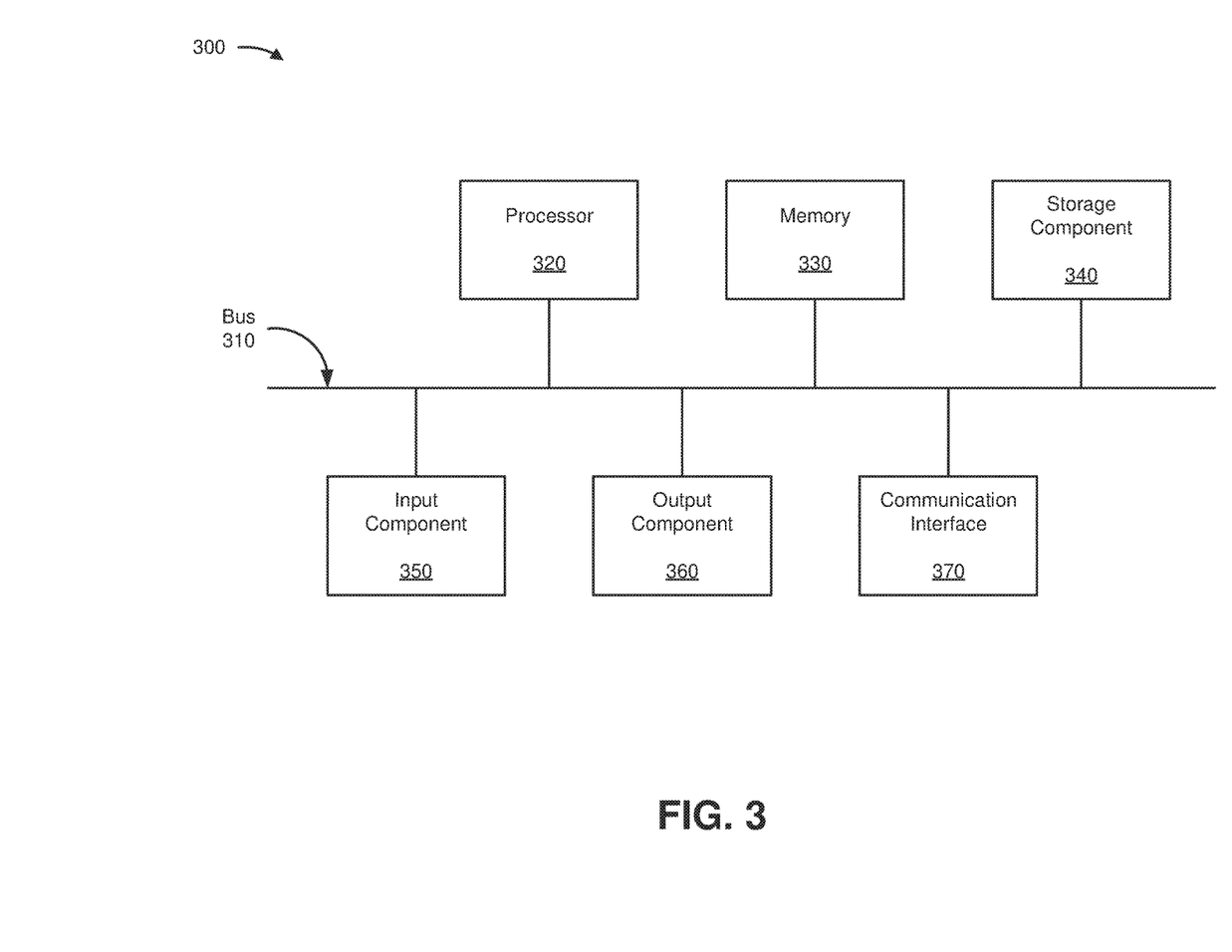
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally. or alternatively, a set of components (e.g., one or more components) of device 300 may perform one or more functions described as being performed by another set of components of device 300.

Figure 4:
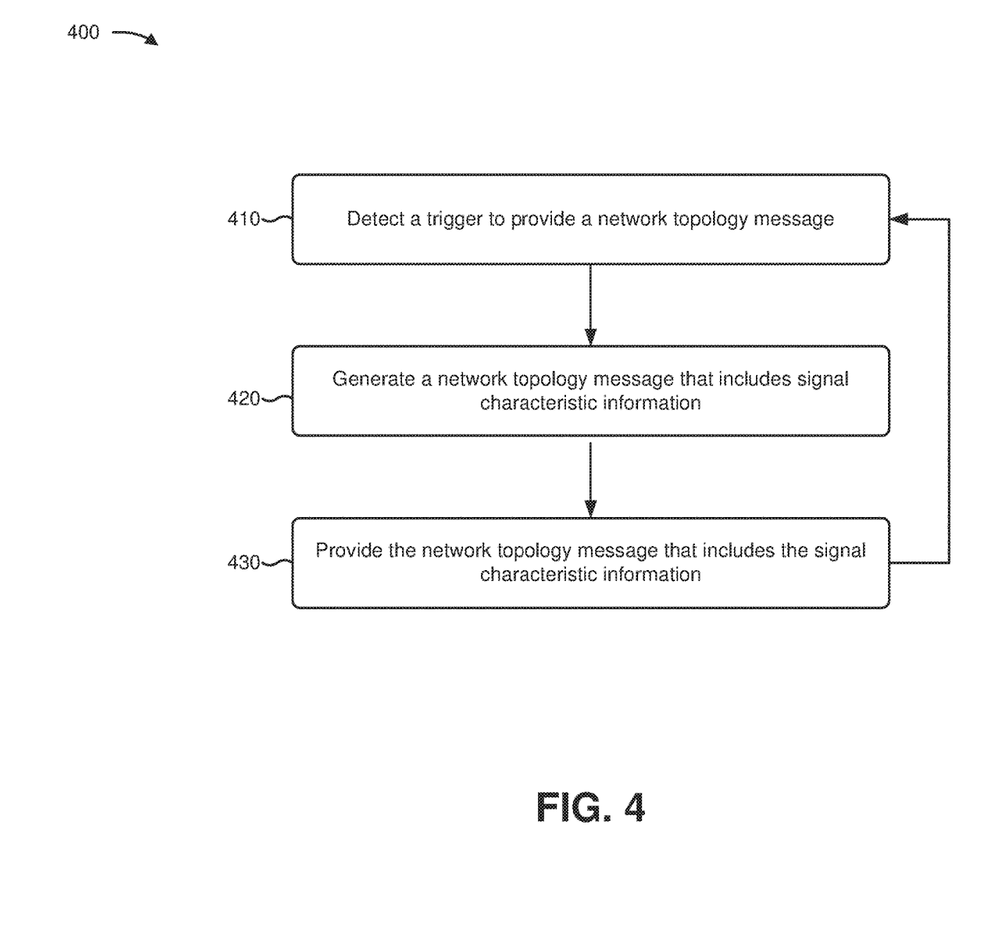
FIG. 4 is a flow chart of an example process for determining a characteristic of a signal.

FIG. 4 is a flow chart of an example process 400 for determining a characteristic of a signal. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include detecting a trigger to provide a network topology message (block 410). For example, network device 210 may detect the trigger to provide a network topology message. A network topology message may refer to a message (e.g., an LLDP message) that includes network topology information identifying a portion of a network topology, such as information identifying network device 210 (e.g., a chassis identifier), information identifying one or more network ports associated with network device 210 (e.g., a set of port identifiers), or the like. In some implementations, network device 210 may detect the trigger to provide the network topology message based on determining that a threshold period of time has elapsed. For example, after a threshold period of time has elapsed (e.g., from a set of network devices 210 being activated, from a previous trigger to provide a previous network topology message, etc.), network device 210 may determine to provide the network topology message.

In some implementations, network device 210 may detect the trigger to provide the network topology message based on receiving a request for network topology information. For example, network device 210 (e.g., endpoint network device 210) may receive a request for the network topology information from another network device 210, and may determine the network topology information based on receiving the request. In some implementations, network device 210 may detect the trigger to provide the network topology message based on receiving network topology information. For example, a first network device 210 may determine that first network device 210 has received network topology information from a second network device 210, and may be triggered to provide network topology information to a third network device 210. In this case, first network device 210, second network device 210, and third network device 210 may be consecutive network devices 210 of a network path.

In some implementations, network device 210 may detect the trigger to provide the network topology message based on receiving signal characteristic information. For example, an intermediate network device 210 may receive signal characteristic information via a first network topology message from a first network device 210, and may be triggered to propagate the signal characteristic information via a second network topology message to a second network device 210. Additionally, or alternatively, network device 210 may detect the trigger to provide the network topology message based on receiving a request for signal characteristic information. In some implementations, network device 210 may detect the trigger to generate a network topology message and/or provide the network topology message based on determining signal characteristic information. For example, a first endpoint network device 210 may determine signal characteristic information regarding an optical signal received by first endpoint network device 210, and may be triggered to provide a network topology message that includes the signal characteristic information.

As shown in FIG. 4, process 400 may include generating a network topology message that includes signal characteristic information (block 420). For example, network device 210 may generate the network topology message and include signal characteristic information in the network topology message. Signal characteristic information may refer to information regarding a signal (e.g., an optical signal), such as a BER value, a signal degradation parameter, a dispersion value, a polarization loss, or the like. In some implementations, network device 210 may obtain the signal characteristic information for inclusion in the network topology message based on performing a measurement. For example, a first endpoint network device 210 may receive an optical signal from a second endpoint network device 210, and may determine a BER value for the optical signal. Additionally, or alternatively, network device 210 may obtain the signal characteristic information from a data structure. For example, when intermediate network device 210 receives a first network topology message including signal characteristic information, intermediate network device 210 may store the signal characteristic information via a data structure. In this case, intermediate network device 210 may obtain the signal characteristic information from the data structure to provide the signal characteristic information via a second network topology message.

In some implementations, network device 210 may include one or more type-length value (TLV) fields relating to network device 210 in the network topology message. For example, network device 210 may generate an LLDP message that includes a set of mandatory TLV fields (e.g., TLV fields required by an LLDP specification), such as one or more chassis identifier TLV fields (e.g., information identifying network device 210), one or more port identifier TLV fields (e.g., information identifying one or more ports of network device 210), or the like. In this case, network device 210 may include the set of mandatory TLV fields in the LLDP message based on the set of mandatory TLV fields being required for each LLDP message that network device 210 provides.

In some implementations, network device 210 may include information identifying the signal characteristic information in another set of TLV fields. For example, network device 210 may generate a set of TLV fields identifying a BER for an optical signal. In this case, the set of TLV fields may include a type field indicating that a value field identifies a BER value, and a value field identifying the BER value. In some implementations, network device 210 may include one or more TLVs identifying the signal characteristic information in an optional portion of a network topology information (e.g., an optional set of TLV fields). For example, network device 210 may identify a portion of an LLDP message allocated for organizationally specific TLV fields, and may include one or more TLV fields identifying the signal characteristic information in the orga-nizationally specific portion of the LLDP message. In this way, network device 210 conveys signal characteristic information via a configurable portion a network topology message.

In some implementations, network device 210 may generate a set of TLV fields identifying a particular network device 210 that determined the signal characteristic information. For example, when a first intermediate network device 210 receives a first network topology message identifying the signal characteristic information determined by endpoint network device 210, first intermediate network device 210 may store information identifying endpoint network device 210 (e.g., a chassis identifier). In this case, first intermediate network device 210 may include one or more TLV fields encapsulating the chassis identifier in a second network topology message for transmission to a second intermediate network device 210. For example, first intermediate network device 210 may include a type field indicating that a value field identifies a chassis identifier of a network device 210 and a value field that identifies the chassis identifier of endpoint network device 210. In this case, first intermediate network device 210 may include the one or more fields encapsulating the chassis identifier in a configurable portion of the second network topology message.

In some implementations, network device 210 may generate multiple different messages. For example, when intermediate network device 210 communicates with a first neighboring network device 210 via a first network port and a second neighboring network device via a second network port, network device 210 may propagate first signal characteristic information regarding a first signal and second signal characteristic information regarding a second signal being transmitted in a direction opposing the first signal. In this way, an intermediate network device 210 may propagate signal characteristic information for a bi-directional network path (e.g., a network path in which signals are transmitted in opposing directions).

As further shown in FIG. 4, process 400 may include providing the network topology message that includes the signal characteristic information (block 430). For example, network device 210 may provide the LLDP message that includes a set of TLV fields identifying the signal characteristic information. In some implementations, network device 210 may provide the message to another network device 210. For example, a first network device 210 may provide the first message to a second, neighboring network device 210 of a network path to convey network topology information and to propagate signal characteristic information regarding a signal of the network path.

In some implementations, network device 210 may provide multiple messages. For example, when a particular intermediate network device 210 is connected via a first network port to a first neighboring network device 210 and via a second network port to a second neighboring network device 210, the particular network device 210 may provide a first network topology message to the first neighboring network device 210 to convey network topology information and to propagate first signal characteristic information. Further to the example, the particular network device 210 may provide a second network topology message to the second neighboring network device 210 to convey network topology information and propagate second signal characteristic information.

In some implementations, network device 210 may provide the network topology message to cause the signal characteristic information to be propagated to an endpoint network device 210. For example, based on a first network device 210 providing the network topology message to a second network device 210, the second network device 210 may be caused to provide another network topology message to propagate the signal characteristic information to endpoint network device 210. In this way, signal characteristic information measured by a first endpoint network device 210 of a network path is propagated, via a set of network topology messages, to a second endpoint network device 210 of the network path.

In some implementations, network device 210 may provide the network topology message to cause the signal characteristic information to be stored. For example, a first network device 210 may provide the network topology message to a second network device 210, and may cause the second network device 210 to obtain the signal characteristic information based on parsing the network topology message, and to store the signal characteristic information via a data structure. In this case, the second network device 210 may obtain the stored signal characteristic information to propagate the stored signal characteristic information via another network topology message, to utilize the stored signal characteristic information to adjust a signal, or the like.

In some implementations, network device 210 may provide the network topology message to cause an adjustment to a signal. For example, a first endpoint network device 210 (that receives an optical signal) may provide the network topology message including the signal characteristic information to propagate the signal characteristic information to a second endpoint network device 210 (that transmits an optical signal). In some implementations, network device 210 may provide another network topology message after providing the network topology message. For example, a threshold period of time after providing the network topology message, network device 210 may be triggered to determine other signal characteristic information based on an optical signal, and may provide the other signal characteristic information via another network topology message.

In some implementations, second endpoint network device 210 may, based on receiving the signal characteristic information, adjust a parameter of the optical signal. For example, second endpoint network device 210 may adjust a transmission power, a shape of the optical signal (e.g., increase a symmetry, increase an asymmetry, etc.), a bias loop of a transmitter portion of second endpoint network device 210, etc. In some implementations, second network device 210 may generate an adjusted optical signal for transmission to first network device 210. For example, second network device 210 may determine that a BER value exceeds a threshold, and may adjust a transmission power such that the BER value for an adjusted optical signal does not exceed the BER value when transmitted to and received by first endpoint network device 210.

Additionally, or alternatively, second endpoint network device 210 may receive the signal characteristic information, and may adjust a tunable dispersion compensation module to adjust the optical signal. For example, second endpoint network device 210 may adjust the tunable dispersion compensation module to reduce a dispersion value, thereby improving network performance for an adjusted optical signal relative to the optical signal.

In some implementations, second endpoint network device 210 may utilize multiple signal characteristic information values to adjust a signal. For example, second endpoint network device 210 may determine an average value of a threshold quantity of BER values, and may adjust the optical signal based on the average value.

FIG. 4 show example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a first endpoint network device 210 performs a measurement of a characteristic of an optical signal, propagates the measurement of the optical signal via one or more intermediate network devices 210 (e.g., via one or more LLDP messages), to a second endpoint network device 210, to cause the second endpoint network device 210 to alter the optical signal, thereby improving network performance associated with the optical signal. Based on transmitting signal characteristic information via a configurable portion of a network topology message (e.g., a set of organizationally specific TLVs of an LLDP message), a pair of endpoint network devices 210 can communicate the signal characteristic information without a direct connection between the pair of endpoint network devices 210 or a separate set of control communications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
an interface; and
one or more processors to:
detect a trigger to provide a network topology message;
generate the network topology message based on detecting the trigger,
a generated network topology message including signal characteristic information,
the signal characteristic information being determined based on a measurement; and
provide, via the interface, the generated network topology message to cause the signal characteristic information to be propagated to an endpoint device and to cause the endpoint device to adjust a parameter of a signal,
the parameter of the signal including at least one of:
a transmission power of the signal, or
a shape of the signal.

2. The network device of claim 1, where the one or more processors, when detecting the trigger, are to:
detect the trigger based on determining that a threshold period of time has elapsed.

3. The network device of claim 1, where the one or more processors, when detecting the trigger, are to:
detect the trigger based on receiving network topology information regarding another device.

4. The network device of claim 1, where the signal characteristic information includes information received from another device.

5. The network device of claim 1, where the signal characteristic information includes information regarding at least one of:
a bit error rate (BER) value,
a signal degradation parameter,
a dispersion value, or
a polarization loss.

6. The network device of claim 1, where the one or more processors are further to:
receive an optical signal; and
determine the signal characteristic information using the received optical signal.

7. The network device of claim 1, where the network topology message includes one or more type-length value (TLV) fields,
the one or more TLV fields including at least one of:
a chassis identifier TLV field, or
a port identifier TLV field.

8. A method, comprising:
detecting, by a network device, a trigger to provide a network topology message;
generating, by the network device, the network topology message based on detecting the trigger,
a generated network topology message including signal characteristic information,
the signal characteristic information being determined based on a measurement; and
providing, by the network device, the generated network topology message to cause the signal characteristic information to be propagated to an endpoint device and to cause the endpoint device to adjust a parameter of a signal,
the parameter of the signal including at least one of:
a transmission power of the signal, or
a shape of the signal.

9. The method of claim 8, further comprising:
generating one or more type-length value (TLV) fields for the signal characteristic information; and
including the one or more TLV fields in the generated network topology message.

10. The method of claim 8, further comprising:
generating one or more type-length value (TLV) fields that identify a particular device that determined the signal characteristic information; and
including the one or more TLV fields in the generated network topology message.

11. The method of claim 8, where the generated network topology message is a first network topology message and the signal characteristic information is a first signal characteristic information;
where the first signal characteristic information is associated with a first signal; and
where the method further comprises:
generating a second network topology message including second signal characteristic information associated with a second signal,
the second signal being transmitted in a direction opposite the first signal.

12. The method of claim 8, where the generated network topology message is a first network topology message;
where providing the generated network topology message comprises:
providing the first network topology message to a first neighboring device; and
where the method further comprises:
generating a second network topology message; and
providing the second network topology message to a second neighboring device.

13. The method of claim 8, where the generated network topology message is a first network topology message and the signal characteristic information is a first signal characteristic information; and
where the method further comprises:
detecting, after a threshold period of time, a trigger to determine second signal characteristic information; and
providing a second network topology message including the second signal characteristic information.

14. The method of claim 8, where the signal characteristic information is included in a configurable portion of the network topology message.

15. A non-transitory computer-readable medium storing instructions, the instructions comprising:
one or more instructions that, when executed by one or more processors of a network device, cause the one or more processors to:
detect a trigger to provide a network topology message;
generate the network topology message based on detecting the trigger,
a generated network topology message including signal characteristic information; and
provide the generated network topology message to cause the signal characteristic information to be propagated to an endpoint device and to cause the endpoint device to adjust a parameter of a signal,
the parameter of the signal including at least one of:

a transmission power of the signal, or
a shape of the signal.

16. The non-transitory computer-readable medium of claim 15, where the one or more instructions, that cause the one or more processors to provide the generated network topology message, cause the one or more processors to:
provide the generated network topology message to cause an adjustment to a bias loop of a transmitter portion of the endpoint device.

17. The non-transitory computer-readable medium of claim 15, where the one or more instructions, that cause the one or more processors to provide the generated network topology message, cause the one or more processors to:
provide the generated network topology message to cause an adjustment to a tunable dispersion compensation module to adjust the signal.

18. The non-transitory computer-readable medium of claim 15, where the endpoint device is a first endpoint device;
where the one or more instructions, when executed by the one or more processors, are further cause the one or more processors to:
receive the signal characteristic information from a second endpoint device; and
where the one or more instructions, that cause the one or more processors to provide the generated network topology message, cause the one or more processors to:
provide the generated network topology message to cause the signal characteristic information to be propagated to the second endpoint device.

19. The non-transitory computer-readable medium of claim 15, where the one or more instructions, when executed by the one or more processors, further cause the one or more processors to:
identify a portion of the generated network topology message allocated for one or more type-length value (TLV) fields; and
include the signal characteristic information in the portion.

20. The non-transitory computer-readable medium of claim 15, where the signal characteristic information is included in a configurable portion of the network topology message.

* * * * *